United States Patent [19]

Tenhover

[11] Patent Number: 4,696,731

[45] Date of Patent: Sep. 29, 1987

[54] AMORPHOUS METAL-BASED COMPOSITE OXYGEN ANODES

[75] Inventor: Michael A. Tenhover, Solon, Ohio

[73] Assignee: The Standard Oil Company, Cleveland, Ohio

[21] Appl. No.: 942,175

[22] Filed: Dec. 16, 1986

[51] Int. Cl.$^4$ .................................................. C25B 1/02
[52] U.S. Cl. ........................... 204/290 R; 204/290 F; 204/129; 204/291; 204/292; 204/293; 204/192.15; 204/192.22; 427/419.2; 427/422; 427/423; 75/65 R; 75/65 EB; 75/83
[58] Field of Search ........ 204/290 F, 290 R, 291–293, 204/129, 192.15, 192.22; 427/419.2, 422, 423; 75/65 R, 83

[56] References Cited

U.S. PATENT DOCUMENTS

| | | | |
|---|---|---|---|
| 3,234,110 | 2/1966 | Beer | 204/38 |
| 3,236,756 | 2/1966 | Beer | 204/98 |
| 3,711,385 | 1/1973 | Beer | 204/59 |
| 3,853,739 | 12/1974 | Kolb et al. | 204/290 F |
| 3,856,513 | 12/1974 | Chen et al. | 75/122 |
| 4,036,638 | 7/1977 | Ray et al. | 75/123 B |
| 4,339,270 | 7/1982 | Hashimoto et al. | 148/403 |
| 4,446,245 | 5/1984 | Hinden | 204/290 F |
| 4,481,097 | 11/1984 | Asano et al. | 204/290 F |
| 4,498,962 | 2/1985 | Oda et al. | 204/129 |
| 4,502,936 | 3/1985 | Hayfield | 204/290 F |
| 4,544,473 | 10/1985 | Ovshinsky | 204/292 |
| 4,560,454 | 12/1985 | Harris et al. | 204/128 |
| 4,609,442 | 9/1986 | Tenhover et al. | 204/95 |

FOREIGN PATENT DOCUMENTS

| | | | |
|---|---|---|---|
| 105453 | 1/1980 | Japan | 204/290 R |
| 105454 | 1/1980 | Japan | 204/290 R |
| 150148 | 4/1980 | Japan | 204/290 R |
| 107439 | 12/1981 | Japan | 204/290 R |
| 2023177 | 5/1979 | United Kingdom | 204/290 R |

OTHER PUBLICATIONS

"The Anodic Polarization Behavior of Amorphous Pd–Ti–P Alloys in NaCl Solutions", *Electrochimica Acta*, 25, pp. 1215–1220 (1980).

"Anodic Characteristics Ruthenium, Rhodium, Iridium or Platinum in a Hot Concentrated Sodium Chloride Solution", *Journal of Applied Electrochemistry*, 13, pp. 295–306, (1983).

"Anodic Characteristics of Amorhpous Palladium–Iridium–Phosphorus Alloys in a Hot Concentrated Sodium Chloride Solution", *Journal of Non-Crystalline Solids*, 54, pp. 85–100 (1983).

*Primary Examiner*—R. L. Andrews
*Attorney, Agent, or Firm*—Joseph G. Curatolo; Larry W. Evans

[57] ABSTRACT

Improved amorphous metal-based composite oxygen anodes comprise a substrate material, a first coating of an amorphous metal alloy applied thereto and a second coating of a mixed metal oxide applied to the first coating and fused therewith. A method for the fabrication of such anodes comprises the step of applying a first coating of an amorphous metal alloy to a substrate material, applying a second coating of a mixed metal oxide to the first coating and fusing the two layers together without crystallinity of the amorphous metal alloy. An electrolytic process employing such anodes is also provided.

40 Claims, No Drawings

AMORPHOUS METAL-BASED COMPOSITE OXYGEN ANODES

TECHNICAL FIELD

The present invention is directed toward novel amorphous metal-based composite anodes which are electrically conductive in electrolytic cells and the use thereof in oxygen generation processes such as electrogalvanization, plating and the like. A method of fabrication is also provided.

Amorphous metal alloy materials have become of interest in recent years due to their unique combinations of mechanical, chemical and electrical properties which are specially well suited for newly emerging applications. Amorphous metal materials have compositionally variable properties, high hardness and strength, flexibility, soft magnetic and ferroelectronic properties, very high resistance to corrosion and wear, unusual alloy compositions, and high resistance to radiation damage. These characteristics are desirable for applications such as low temperature welding alloys, magnetic bubble memories, high field superconducting devices and soft magnetic materials for power transformer cores.

Given their resistance to corrosion, the amorphous metal-based anodes disclosed herein are particularly useful as oxygen anodes. Other uses as electrodes include copper plating, electrogalvanization, etching; use as an anode in electrowinning of copper and zinc; use in fuel cells; use in waste water treatment; in organic reactions such as pinacol formation and other processes requiring high current oxygen electrodes.

BACKGROUND ART

The unique combination of properties possessed by amorphous metal alloy materials may be attributed to the disordered atomic structure of amorphous materials which ensures that the material is chemically homogeneous and free from the extended defects that are known to limit the performance of crystalline materials.

Generally, amorphous materials are formed by rapidly cooling the material from a molten state. Such cooling occurs at rates on the order of $10^{6\circ}$ C./second. Processes that provide such cooling rates include sputtering, vacuum evaporation, plasma spraying and direct quenching from the liquid state. Direct quenching from the liquid state has found the greatest commercial success inasmuch as a variety of alloys are known that can be manufactured by this technique in various forms such as thin films, ribbons and wires.

U.S. Pat. No. 3,856,513 describes novel metal alloy compositions obtained by direct quenching from the melt and includes a general discussion of this process. The patent describes magnetic amorphous metal alloys formed by subjecting the alloy composition to rapid cooling from a temperature above its melting temperature. A stream of the molten metal was directed into the nip of rotating double rolls maintained at room temperature. The quenched metal, obtained in the form of a ribbon, was substantially amorphous as indicated by X-ray diffraction measurements, was ductile, and had a tensile strength of about 350,000 psi (2415 MPa).

U.S. Pat. No. 4,036,638 describes binary amorphous alloys of iron or cobalt and boron. The claimed amorphous alloys were formed by a vacuum melt-casting process wherein molten alloy was ejected through an orifice and against a rotating cylinder in a partial vacuum of about 100 millitorr. Such amorphous alloys were obtained as continuous ribbons and all exhibit high mechanical hardness and ductility.

U.S. Pat. No. 4,264,358 discloses amorphous superconducting glassy alloys comprising one or more Group IVB, VB, VIB, VIIB or VIII transition metals and one or more metalloids such as B, P, C, N, Si, Ge or Al. The alloys are stated to have utility as high field superconducting magnet materials.

The amorphous metal alloys described hereinabove have not been suggested for usage as electrodes in electrolytic processes in distinction from the alloys that are utilized to prepare the anodes of the present invention. With respect to processes for chlorine evolution from sodium chloride solutions, certain palladium-phosphorus based metal alloys have been prepared and described in U.S. Pat. No. 4,339,270 which discloses a variety of ternary amorphous metal alloys consisting of 10 to 40 atomic percent phosphorus and/or silicon and 90 to 60 atomic percent of two or more of palladium, rhenium and platinum. Additional elements that can be present include titanium, zirconium, niobium, tantalum and/or iridium. The alloys can be used as electrodes for electrolysis and the patent reports high corrosion resistance in the electrolysis of halide solutions.

The anodic characteristics of these alloys have been studied by three of the patentees, M. Hara, K. Hashimoto and T. Masumoto and reported in various journals. One such publication entitled "The Anodic Polarization Behavior of Amorphous Pd-Ti-P Alloys in NaCl Solution" *Electrochimica Acta*, 25, pp. 1215-1220 (1980) describes the reaction of palladium chips and phosphorus at elevated temperatures to form palladium phosphide which is then melted with titanium. The resulting alloy was then formed into ribbons 10 to 30 microns in thickness by the rotating wheel method.

"Anodic Characteristics of Amorphous Ternary Palladium-Phosphorus Alloys Containing Ruthenium, Rhodium, Iridium, or Platinum in a Hot Concentrated Sodium Chloride Solution", reported in the *Journal of Applied Electrochemistry* 13, pp. 295-306 (1983) describes the entitled alloys, again prepared by the rotating wheel method from the molten state. Palladium-silicon alloys were also prepared and evaluated but were found to be unsatisfactory as anodes. The reported anode alloys were found to be more corrosion resistant and had a higher chlorine activity and lower oxygen activity than DSA.

Lastly, "Anodic Characteristics of Amorphous Palladium-Iridium-Phosphorus Alloys in a Hot Concentrated Sodium Chloride Solution" reported in *Journal of Non-Crystalline Solids*, 54, pp. 85-100 (1983) describes such alloys also prepared by the rotating wheel method. Again, moderate corrosion resistance, high chlorine activity and low oxygen activity were reported.

The authors found that the electrocatalytic selectivity of these alloys was significantly higher than that of the known dimensionally stable anodes (DSA) consisting of an oxide mixture of ruthenium, and titanium supported by metallic titanium. A disadvantage of DSA is that the electrolysis of sodium chloride is not entirely selective for chlorine and some oxygen is produced. The alloys reported are less active for oxygen evolution than DSA.

Dimensionally stable anodes are described in the following three early U.S. patents. U.S. Pat. No. 3,234,110 calls for an electrode comprising titanium or a titanium alloy core, coated at least partially with titanium oxide which coating is, in turn, provided with a noble metal coating such as platinum, rhodium, iridium and alloys thereof.

U.S. Pat. No. 3,236,756 discloses an electrode comprising a titanium core, a porous coating thereon of platinum and/or rhodium and a layer of titanium oxide on the core at the places where the coating is porous.

U.S. Pat. No. 3,711,385 is directed toward electrodes comprising a core of a film forming metal consisting of titanium, tantalum, zirconium, niobium and tungsten, carrying an outside layer of a metal oxide of at least one platinum metal from the group consisting of platinum, iridium, rhodium, palladium, ruthenium and osmium.

All three of these electrodes have utility in electrolytic processes although unlike the anodes of the present invention, none contain amorphous metals. Thus, despite the state of the art in amorphous metal alloys, there has not been a teaching heretofore of the use of platinum based amorphous metal alloy composite structures as anodes in processes such as electrogalvanization and oxygen evolution. The specific anodes disclosed herein are oxygen evolving and extremely corrosion resistant.

SUMMARY OF THE INVENTION

The present invention is directed toward improved amorphous metal-based composite oxygen anodes. Such anodes comprise a substrate material, a first coating of an amorphous metal alloy applied thereto and a second coating of a mixed metal oxide applied to the first coating and fused therewith.

A method for the fabrication of such anodes comprises the steps of applying a first coating of an amorphous metal alloy to a substrate material, applying a second coating of a mixed metal oxide to the first coating and fusing the two coatings together without inducing crystallinity of said amorphous alloy.

An electrolytic process which evolves oxygen at the anode comprises the step of conducting the process in an electrolytic cell having an amorphous metal-based anode which comprises a substrate material, a first coating of an amorphous metal alloy applied thereto and a second coating of a mixed metal oxide applied to the first coating and fused therewith.

PREFERRED MODE FOR CARRYING OUT THE INVENTION

Electrolytic processes wherein oxygen anodes are employed include electrofiltration, electrogalvanizing, electrowinning, water treatment, and oxygen generation. It has now been found that substrate metals coated with layers of certain amorphous metal-based alloys form novel oxygen anodes which exhibit excellent corrosion resistance in oxygen generation processes.

As stated hereinabove, the anodes of this invention comprise a substrate material upon which is deposited two layers, one of which is an amorphous metal alloy and the other is a mixed metal oxide. Preferred substrate materials for use as the anodes are conductive and include metals such as titanium, niobium, tantalum and zirconium, although other metals and various non-metals are also suitable such as carbon, silicon carbide and titanium diboride. The substrate is useful primarily to provide support for the amorphous metal alloys and therefore can also be a nonconductor or semi-conductor material.

More specifically, the amorphous metal-based anodes of the present invention comprise a substrate material, a first coating of a platinum-based amorphous metal alloy having the formula

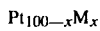

$$Pt_{100-x}M_x$$

where
M is P, As, Si, B, Ge, Al, Sb and mixtures thereof and
x is greater than 0 and less than or equal to 25;
and a second coating of an iridium-ruthenium metal oxide having the formula

$$Ir_{100-y}Ru_yO_z$$

where
y is between 20 and 80 and
z is about 200.

The amorphous metal alloys can be binary or ternary and the use of the phrase "amorphous metal alloys" herein refers to amorphous metal-containing alloys that may also comprise one or more of the foregoing non-metallic elements. Amorphous metal alloys may thus include non-metallic elements such as boron, silicon, phosphorus, arsenic and germanium. Several preferred combinations of elements for these alloys include Pt/Si; Pt/Ge; Pt/Ge/Si; Pt/B/Si; Pt/B; Pt/P; Pt/As and Pt/Si/As.

These alloys can be prepared by any of the standard techniques for fabricating amorphous metal alloys. Thus, any physical or chemical method, such as electron beam evaporation, chemical and/or physical decomposition, ion-cluster, ion plating or R.F. and D.C. sputtering process can be utilized. The amorphous alloys can be solid, powder or thin film form but are attached to a substrate. Trace impurities such as O, N, S, Se, Te and Ar are not expected to be seriously detrimental to the preparation and performance of the materials. The only restriction on the environment in which the materials are prepared or operated is that the temperature during both stages be lower than the crystallization temperature of the amorphous metal alloy.

The mixed metal oxide layer of iridium and ruthenium can be prepared by a number of vapor deposition techniques such as electron beam evaporation, ion plating, or R.F. and D.C. sputtering. This also includes reactive deposition such as deposition occurring in the presence of oxygen.

As noted hereinabove, the present invention also provides a method of preparing amorphous metal-based composite oxygen anodes. More specifically, such a method comprises the steps of applying to a substrate material a first coating of an amorphous metal alloy selected from the group consisting of alloys having the formula

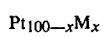

$$Pt_{100-x}M_x$$

where
M is P, As, Si, B, Ge, Al, Sb and mixtures thereof and
x is greater than 0 and less than or equal to 25;
applying a second coating of a mixed metal oxide selected from the group consisting of compounds having the formula

$$Ir_{100-y}Ru_yO_z$$

where
y is between 20 and 80 and
z is about 200;

and, fusing said coatings together onto the substrate metal without inducing crystallization of the amorphous metal alloy.

The amorphous metal alloy composites disclosed herein are utilized as oxygen anodes in various electrochemical processes. While the commercial interest in a given process may focus on what occurs at the cathode, and the oxygen anode merely balances the reaction, the corrosion resistance and reduced power consumption provides a significant improvement in existing processes which use conventional anodes.

The coating is readily deposited upon the substrate by sputtering, as was done for the examples presented hereinbelow. Coating thicknesses are not crucial and may range broadly, for example, up to about 20 microns although other thicknesses are not necessarily precluded so long as they are practical for their intended use. A useful thickness for the first coating ranges between about one to 10 microns, with five being preferred, and for the second coating a range of about one to 10 microns is possible with five being preferred.

As will be appreciated, the desired thickness is somewhat dependent upon the process of preparation of the anode and somewhat upon the intended use. Where a sputtering process is employed, relatively thin layers can be deposited onto the substrate, as noted hereinabove.

Irrespective of the thicknesses of the amorphous metal alloy coatings, the alloys are substantially amorphous. The term "substantially" as used herein in reference to the amorphous metal alloy means that the metal alloys are at least 50 percent amorphous. Preferably the metal alloy is at least 80 percent amorphous and most preferably about 100 percent amorphous, as indicated by X-ray diffraction analysis.

In order to maintain the amorphous nature of the first coating, the two coating layers must be fused by a step that does not raise the temperature of the amorphous metal to the point of crystallinity, otherwise corrosion resistance of the anode will be severely decreased. Suitable means by which the desired fusing can be effected include the use of an electric spot welder, a laser or comparable technique. So lone as the two coating layers can become mixed and fused together without loss of the amorphous nature of the first coating, any suitable equipment or step as would be known to those skilled in the art can be employed. Thus, it is to be understood that the art can be employed. Thus, it is to be understood that the step of fusing is used in a broad context and should not be limited to a specific method such as spot welding.

Finally, the present invention also provides an electrolytic process which evolves oxygen from an aqueous electrolyte solution at the anode which comprises the step of conducting the process in an electrolytic cell having an amorphous metal-based composite anode. More specifically, such an anode comprises a substrate material, a first coating of an amorphous metal alloy group consisting of alloys having the formula $Pt_{100-x}M_x$ where
M is P, As, Si, B, Ge, Al, Sb and mixtures thereof and
x is greater than 0 and less than to equal to 25 and
a second coating of a mixed metal oxide selected from the group consisting of compounds having the formula $Ir_{100-y}Ru_yO_z$ where
y is between 20 and 80 and
z is about 200 and
applied to the first coating and fused therewith.

The processes of electrolysis such as discussed hereinabove can be conducted at standard conditions known to those skilled in the art. These include, voltages in the range of from about 1 to 20 volts (SCE) and current densities of from about 5 to 2000 mAmp/cm$^2$. Electrolyte solutions (aqueous) are generally at a pH of 1 to 12 and molar concentrations of from about 0.25 to 4M. Temperature can range between about 0° to 100° C. with a range of 20° to 70° C. being preferred. The particular cell configuration is not crucial to practice of the process and therefore is not a limitation of the present invention.

In the examples which follow, two amorphous metal-based composite alloys were prepared via radio frequency sputtering in argon gas. A 2" Research S-Gun, manufactured by Sputtered Films, Inc. was employed. As is known, DC sputtering can also be employed. For each of the examples, a titanium substrate was positioned to receive the deposition of the first sputtered amorphous alloy followed by the coating of the mixed metal oxide. The distance between the target and the substrate in each instance was approximately 10 cm.

TABLE I

Novel Amorphous Metal-Based Composite Anodes

| | Anode 1 | |
|---|---|---|
| Substrate | Titanium | 2.1 microns |
| Amorphous Alloy | $Pt_{90}P_{10}$ | 2000Å |
| Metal Oxide | $Ir_{25}Ru_{75}O_{200}$ | |
| | Anode 2 | |
| Substrate | Titanium | 1.5 microns |
| Amorphous Alloy | $Pt_{84}Si_{16}$ | 2000Å |
| Metal Oxide | $Ir_{75}Ru_{25}O_{200}$ | |

For purposes of comparison, three commercially used electrodes Nos. 3–5 and three control electrodes Nos. 6–8, were also employed as follows:

TABLE II

Comparative Anodes

| Anode Nos. | Type | Thickness |
|---|---|---|
| 3 | DSA ($RuO_2/TiO_2$) | Approximately 10 microns |
| 4 | TIR-2000($Ir_{25}Ru_{75}O_{200}$) | Approximately 10 microns |
| 5 | Pt coated Ti | Approximately 1 micron |
| 6 | $Pt_{90}P_{10}$ on Ti substrate $Ir_{25}Ru_{75}O_{200}$ thereover no fusing | 2.1 microns 2000Å |
| 7 | $Pt_{90}P_{10}$ on Ti substrate no $Ir_{25}Ru_{75}O_{200}$ thereover | 2.1 microns |
| 8 | $Ir_{25}Ru_{75}O_{200}$ on Ti substrate no $Pt_{90}P_{10}$ thereover | 2000Å |

Anodes 6–8 were prepared as controls to evaluate the effect of the coatings together, without fusing, and individually.

The amorphous metal-based composite anodes and comparison anodes were then employed as the oxygen anode in a two electrode electrochemical test configuration in a solution comprising 10% copper sulfate, 10% sulfuric acid, 0.5% nitric acid, all percentages by weight, and less than 20 ppm Cl$^-$. Corrosion rates were determined and are reported in Table III. Current densities for the measurements were 2.5 Amp/cm$^2$, a much higher current than is commercially employed.

TABLE III

Corrosion Rates for Anodes 1-8

| Anode | Corrosion Rate mg/KAmp. Hr. |
|---|---|
| 1 | 8.5 |
| 2 | 11.4 |
| 3 | 75.0 |
| 4 | 13.0 |
| 5 | 30.4 |
| 6 | 19.0 |
| 7 | 18.0 |
| 8 | 70.0 |

The foregoing examples demonstrate the use of improved amorphous metal-based composite oxygen anodes in at least one electrolytic process simulating a zinc plating process. The test solution contained no zinc salts inasmuch as the electrochemical reaction proceeds at the anode just the same as if plating were occurring at the cathode. In all instances, large quantities of oxygen were evolved at the anode which, with the corrosion data, allow one to determine usefulness of the anodes of the present invention. As can be seen from the data presented in Table III, anodes 1 and 2 exhibited significantly better corrosion resistance than the known anodes 3-5. As to controls 6-8, the benefit of fusing is reflected again in the better corrosion resistance of anodes 1 and 2. Thus, employing the amorphous metal-based composite oxygen anodes of the present invention in the foregoing two electrode test and test solution at voltages of five to 10 volts and a current density of 1 Amp/cm$^2$ will result in a corrosion rate of less than about 15 mg/KAmp. Hr.

In conclusion, although several amorphous metal-based composite oxygen anodes have been exemplified herein, it will readily be appreciated by those skilled in the art that other amorphous metal alloys could be subtituted for those disclosed to provide an oxygen anode for virtually any electrolytic process where an oxygen anode is required.

It is to be understood that the foregoing examples have been provided to enable those skilled in the art to have representative examples by which to evaluate the invention and that these examples should not be construed as any limitation on the scope of this invention. Inasmuch as the structural thicknesses and composition of the amorphous metal-based composite oxygen anodes employed in the present invention can be varied within the scope of the total specification disclosure, neither the particular amorphous alloy components nor the relative amounts of the components comprising these alloys and metal oxides as exemplified herein shall be construed as limitations of the invention.

Furthermore, while these alloys were prepared by a sputtering technique which is a useful means for depositing the alloy onto a metal substrate such as titanium, it is to be understood that neither the step of sputtering nor the fusing by spot welding are to be construed as limitations of the present invention, inasmuch as the oxygen anodes can be prepared by other steps of applying and fusing.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

I claim:

1. Amorphous metal-based composite anodes comprising:
    a substrate material;
    a first coating of an amorphous metal alloy applied thereto; and
    a second coating of a mixed metal oxide applied to said first coating and fused therewith.

2. Amorphous metal-based composite anodes, as set forth in claim 1, wherein said amorphous metal alloy is selected from the group consisting of alloys having the formula $$Pt_{100-x}M_x$$

where
M is P, As, Si, B, Ge, Al, Sb and mixtures thereof and
x is greater than 0 and less than or equal to 25.

3. Amorphous metal-based composite anodes, as set forth in claim 2, wherein said mixed metal oxide is selected from the group consisting of alloys having the formula $$Ir_{100-y}Ru_yO_z$$

where
y is between 20 and 80 and
z is about 200.

4. Amorphous metal-based composite anodes, as set forth in claim 3, wherein said amorphous metal alloy comprises Pt and P.

5. Amorphous metal-based composite anodes, as set forth in claim 4, wherein said amorphous metal alloy is $Pt_{90}P_{10}$; said mixed metal oxide is $Ir_{75}Ru_{25}O_{200}$ and said substrate material is titanium.

6. Amorphous metal-based composite anodes, as set forth in claim 3, wherein said amorphous metal alloy comprises Pt and Si.

7. Amorphous metal-based composite anodes, as set forth in claim 6, wherein said amorphous metal alloy is $Pt_{84}Si_{16}$; said mixed metal oxide is $Ir_{25}Ru_{75}O_{200}$ and said substrate material is titanium.

8. Amorphous metal-based composite anodes, as set forth in claim 1, wherein the thickness of said first coating ranges between about one to 20 microns and the thickness of said second coating ranges between about one to 20 microns.

9. Amorphous metal-based composite anodes, as set forth in claim 1, wherein said amorphous metal alloys are at least 50 percent amorphous.

10. Amorphous metal-based composite anodes, as set forth in claim 1, wherein said amorphous metal alloys are at least 80 percent amorphous.

11. Amorphous metal-based composite anodes, as set forth in claim 1, wherein said amorphous metal alloys are about 100 percent amorphous.

12. Amorphous metal-based composite anodes, as set forth in claim 1, having a corrosion rate of less than about 15 mg/KAmp. Hr. as measured in an electrolyte consisting essentially of 10 percent by weight copper sulfate, 10 percent by weight sulfuric acid and 0.5 percent by weight nitric acid and in an electrolytic process conducted at a voltage of about five to 10 volts and a current density of 1 Amp/cm$^2$.

13. A method for the preparation of amorphous metal-based composite anodes comprising the steps of:

applying a first coating of an amorphous metal alloy to a substrate material;

applying a second coating of a mixed metal oxide to said first coating; and fusing said first and second coatings together without inducing crystallization of said amorphous alloy.

14. A method, as set forth in claim 13, wherein said amorphous metal alloy is selected from the group consisting of alloys having the formula $Pt_{100-x}M_x$ where M is P, As, Si, B, Ge, Al, Sb and mixtures thereof and x is greater than 0 and less than or equal to 25.

15. A method, as set forth in claim 14, wherein said mixed metal oxide is selected from the group consisting of compounds having the formula $Ir_{100-y}Ru_yO_z$ where y is between 20 and 80 and z is about 200.

16. A method, as set forth in claim 15, wherein said amorphous metal alloy comprises Pt and P.

17. A method, as set forth in claim 16, wherein said amorphous metal alloy is $Pt_{90}P_{10}$; said mixed metal oxide is $Ir_{75}Ru_{25}O_{200}$ and said substrate material is titanium.

18. A method, as set forth in claim 15, wherein said amorphous metal alloy comprises Pt and Si.

19. A method, as set forth in claim 18, wherein said amorphous metal alloy is $Pt_{84}Si_{16}$; said mixed metal oxide is $Ir_{25}Ru_{75}O_{200}$ and said substrate material is titanium.

20. A method, as set forth in claim 13, wherein the thickness of said first coating ranges between about one to 20 microns and the thickness of said second coating ranges between about one to 20 microns.

21. A method, as set forth in claim 13, wherein said amorphous metal alloys are at least 50 percent amorphous.

22. A method, as set forth in claim 13, wherein said amorphous metal alloys are at least 80 percent amorphous.

23. A method, as set forth in claim 13, wherein said amorphous metal alloys are about 100 percent amorphous.

24. A method, as set forth in claim 13, wherein said steps of applying are conducted by ion plating.

25. A method, as set forth in claim 13, wherein said steps of applying are conducted by sputtering.

26. A method, as set forth in claim 13, wherein said step of fusing is conducted by spot welding.

27. A method, as set forth in claim 13, wherein said step of fusing is conducted by laser.

28. A method, as set forth in claim 13, said anode having a corrosion rate of less than about 15 mg/KAmp. Hr. as measured in an electrolyte consisting essentially of 10 percent by weight copper sulfate, 10 percent by weight sulfuric acid and 0.5 percent by weight nitric acid and in an electrolytic process conducted at a voltage of about five to 10 volts and a current density of 1 Amp/cm².

29. An electrolytic process employing oxygen anodes comprising the step of:

conducting said electrolytic process in an electrolytic cell having an amorphous metal-based composite anode comprising a substrate material;

a first coating of an amorphous metal alloy applied thereto; and a second coating of a mixed metal oxide applied to said first coating and fused therewith.

30. An electrolytic process, as set forth in claim 29, wherein said amorphous metal alloy is selected from the group consisting of alloys having the formula $Pt_{100-x}M_x$ where M is P, As, Si, B, Ge, Al, Sb and mixtures thereof and x is greater than 0 and less than or equal to 25.

31. An electrolytic process, as set forth in claim 30, wherein said mixed metal oxide is selected from the group consisting of compounds having the formula $Ir_{100-y}Ru_yO_z$ where y is between 20 and 80 and z is about 200.

32. An electrolytic process, as set forth in claim 31, wherein said amorphous metal alloy comprises Pt and P.

33. An electrolytic process, as set forth in claim 32, wherein said amorphous metal alloy is $Pt_{90}P_{10}$; said mixed metal oxide is $Ir_{75}Ru_{25}O_{200}$ and said substrate material is titanium.

34. An electrolytic process, as set forth in claim 31, wherein said amorphous metal alloy comprises Pt and Si.

35. An electrolytic process, as set forth in claim 34, wherein said amorphous metal alloy is $Pt_{84}Si_{16}$; said mixed metal oxide is $Ir_{25}Ru_{75}O_{200}$ and substrate material is titanium.

36. An electrolytic process, as set forth in claim 29, wherein the thickness of said first coating ranges between about one to 20 microns and the thickness of said second coating ranges between about one to 20 microns.

37. An electrolytic process, as set forth in claim 29, wherein said amorphous metal alloys are at least 50 percent amorphous.

38. An electrolytic process, as set forth in claim 29, wherein said amorphous metal alloys are at least 80 percent amorphous.

39. An electrolytic process, as set forth in claim 29, wherein said amorphous metal alloys are about 100 percent amorphous.

40. An electrolytic process, as set forth in claim 29, said anode having a corrosion rate of less than about 15 mg/KAmp. Hr. as measured in an electrolyte consisting essentially of 10 percent by weight copper sulfate, 10 percent by weight sulfuric acid and 0.5 percent by weight nitric acid and in an electrolytic process conducted at a voltage of about five to 10 volts and a current density of 1 Amp/cm².

* * * * *